United States Patent
Yamaguchi

(10) Patent No.: US 10,534,707 B2
(45) Date of Patent: Jan. 14, 2020

(54) SEMICONDUCTOR DEVICE INCLUDING PLURALITY OF BUS MASTERS AND CONTROL DEVICE AND PROGRAM USED IN THE SEMICONDUCTOR DEVICE

(71) Applicant: Renesas Electronics Corporation, Tokyo (JP)

(72) Inventor: Takashi Yamaguchi, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/059,792

(22) Filed: Aug. 9, 2018

(65) Prior Publication Data
US 2019/0087329 A1 Mar. 21, 2019

(30) Foreign Application Priority Data
Sep. 20, 2017 (JP) ................. 2017-180447

(51) Int. Cl.
G06F 12/06 (2006.01)
G06F 13/40 (2006.01)
G06F 13/16 (2006.01)

(52) U.S. Cl.
CPC .......... *G06F 12/06* (2013.01); *G06F 13/1668* (2013.01); *G06F 13/40* (2013.01)

(58) Field of Classification Search
CPC combination set(s) only.
See application file for complete search history.

(56) References Cited

U.S. PATENT DOCUMENTS

2005/0182908 A1 8/2005 Kang
2008/0178024 A1 7/2008 Kamegawa

FOREIGN PATENT DOCUMENTS

JP H10-228413 A 8/1998

OTHER PUBLICATIONS

Extended European Search Report dated Feb. 15, 2019 for European Patent Application No. 18187901.6-1224.

*Primary Examiner* — Raymond N Phan
(74) *Attorney, Agent, or Firm* — McGinn IP Law Group, PLLC

(57) ABSTRACT

The present disclosure provides a technique of suppressing competition of processes in a semiconductor device employing a multilayer bus configuration. A semiconductor device employing a multilayer bus configuration includes a control device controlling an access from each of bus maters to each memory, and a storage device for storing a corresponding relation between identification information identifying a storage region included in each memory and a group to which the storage region belongs. On the basis of an instruction of assuring a storage region including designation of a group, with reference to a corresponding relation between a group designated by an instruction and identification information from the corresponding relation stored in the storage device, the control device specifies one or more storage regions belonging to the designated group, assures the storage region used by a bus master on the basis of the use state of the specified storage region, and outputs information for accessing the assured storage region to the bus master corresponding to the instruction.

9 Claims, 18 Drawing Sheets

| ID | ADDRESS | USE CONDITIONS ||
| | | TASK | ADDRESS |
|---|---|---|---|
| 1 | 0×0000 TO 0×8FFF | TASK 1 | 0×0000 TO 0×1FFF |
| | | TASK 2 | 0×2000 TO 0×3FFF |
| | | ... | ... |
| 2 | ... | ... | ... |
| 3 | ... | ... | ... |
| 4 | ... | ... | ... |
| 5 | ... | ... | ... |
| 6 | ... | ... | ... |

| ID | ADDRESS | GROUP ID | USE CONDITIONS | | |
|---|---|---|---|---|---|
| | | | FLAG | TASK | ADDRESS |
| 1 | 0×0000 TO 0×8FFF | 1 | 1 | TASK 1 | 0×0000 TO 0×1FFF |
| | | | 0 | TASK 2 | 0×2000 TO 0×3FFF |
| | | | ... | ... | ... |
| 2 | ... | 1 | ... | ... | ... |
| 3 | ... | 1 | ... | ... | ... |
| 4 | ... | 2 | ... | ... | ... |
| 5 | ... | 2 | ... | ... | ... |
| 6 | ... | 1 | ... | ... | ... |

FIG. 8

| ID | ADDRESS | GROUP ID | USE CONDITIONS | | |
|---|---|---|---|---|---|
| | | | FLAG | TASK | ADDRESS |
| 1 | ... | 1 | 1 | TASK 1 | ... |
| | | | 1 | TASK 4 | ... |
| 2 | ... | 1 | 1 | TASK 1 | ... |
| | | | 0 | TASK 5 | ... |
| 3 | ... | 1 | 1 | TASK 2 | ... |
| 4 | ... | 2 | 0 | TASK 3 | ... |
| 5 | ... | 2 | 0 | TASK 3 | ... |
| 6 | ... | 1 | 1 | TASK 2 | ... |

| ID | ADDRESS | SLAVE ID | GROUP ID | USE CONDITIONS ||| 
|---|---|---|---|---|---|---|
| | | | | FLAG | TASK | ADDRESS |
| 1 | 0×0000 TO 0×8FFF | 1 | 1 | 1 | TASK 1 | 0×0000 TO 0×1FFF |
| | | | | 0 | TASK 2 | 0×2000 TO 0×3FFF |
| | | | | ... | ... | ... |
| 2 | ... | 2 | 1 | ... | ... | ... |
| 3 | ... | 3 | 1 | ... | ... | ... |
| 4 | ... | 4 | 2 | ... | ... | ... |
| 5 | ... | 5 | 2 | ... | ... | ... |
| 6 | ... | 1 | 1 | ... | ... | ... |

FIG. 13

| ID | ADDRESS | SLAVE ID | GROUP ID | USE CONDITIONS | | |
|---|---|---|---|---|---|---|
| | | | | FLAG | TASK | ADDRESS |
| 1 | ... | 1 | 1 | 1 | TASK 1 | ... |
| | | | | 1 | TASK 4 | ... |
| 2 | ... | 2 | 1 | 1 | TASK 1 | ... |
| | | | | 0 | TASK 5 | ... |
| 3 | ... | 3 | 1 | 1 | TASK 2 | ... |
| 4 | ... | 4 | 2 | 0 | TASK 3 | ... |
| 5 | ... | 5 | 2 | 0 | TASK 3 | ... |
| 6 | ... | 1 | 1 | 1 | TASK 2 | ... |

| ID | ADDRESS | SLAVE ID | GROUP ID | USE CONDITIONS | | |
|---|---|---|---|---|---|---|
| | | | | FLAG | TASK | ADDRESS |
| 1 | 0×0000 TO 0×8FFF | 1 | 1, 2 | 1 | TASK 1 | 0×0000 TO 0×1FFF |
| | | | | 0 | TASK 2 | 0×2000 TO 0×3FFF |
| | | | | ... | ... | ... |
| 2 | ... | 2 | 1, 2 | ... | ... | ... |
| 3 | ... | 3 | 1, 2 | ... | ... | ... |
| 4 | ... | 4 | 1, 2 | ... | ... | ... |
| 5 | ... | 5 | 1, 2 | ... | ... | ... |
| 6 | ... | 1 | 1, 2 | ... | ... | ... |
| 7 | ... | 6 | 2, 3 | ... | ... | ... |
| 8 | ... | 7 | 2, 3 | ... | ... | ... |

| SLAVE ID | GROUP ID | ADDRESS | USE CONDITIONS ||
| --- | --- | --- | --- | --- |
| | | | TASK | ADDRESS |
| 1 | 1 | 0×0000 TO 0×8FFF | TASK 1 | 0×0000 TO 0×1FFF |
| | | | TASK 2 | 0×2000 TO 0×3FFF |
| | | | ... | ... |
| 2 | 1 | ... | ... | ... |
| 3 | 1 | ... | ... | ... |
| 4 | 2 | ... | ... | ... |
| 5 | 2 | ... | ... | ... |

SEMICONDUCTOR DEVICE INCLUDING PLURALITY OF BUS MASTERS AND CONTROL DEVICE AND PROGRAM USED IN THE SEMICONDUCTOR DEVICE

CROSS-REFERENCE TO RELATED APPLICATIONS

The disclosure of Japanese Patent Application No. 2017-180447 filed on Sep. 20, 2017 including the specification, drawings and abstract is incorporated herein by reference in its entirety.

BACKGROUND

The present disclosure relates to a semiconductor device and, more specifically, relates to a semiconductor device employing a multilayer bus configuration.

In recent years, as the semiconductor manufacturing technique improves, a semiconductor integrated circuit is miniaturized, and "system-on-chip" in which a processor core and a plurality of function blocks are mounted on the same chip is being developed. A system-on-chip mainly employs a multilayer bus configuration in which a plurality of buses are preliminarily provided for functions. With the bus configuration, a plurality of bus masters can access different bus slaves at the same time.

As a semiconductor device employing the multilayer bus configuration, for example, Japanese Unexamined Patent Application Publication No. Hei 10(1998)-228413 (patent literature 1) discloses a device "which arbitrates competition of accesses to buffers related to a plurality of memory banks by arbitrating means by sending data which is read/written from/to the memories by masters via buffers for the respective masters provided for memory banks" (refer to "Abstract").

SUMMARY

Basically, an access to a memory (bus slave) from a bus master is designed in advance by a software developer. A developer designs software so that a plurality of bus masters do not access the same memory at the same timing (so as not to compete). The reason is that time required for competed processes (tasks) becomes long. However, in some cases, it is difficult to design software so that a plurality of processes do not compete. Consequently, a technique for preventing competition of processes is necessary in some aspect.

Since a developer has to develop software in consideration of a memory used when a process (task) is performed so that competition of processes do not occur, it is difficult to develop software efficiently. Consequently, in some aspect, a technique which makes a developer easily develop software is necessary.

The present disclosure is made to solve the problems as described above and an object in an aspect is to provide a technique of suppressing competition of processes in a semiconductor device employing a multilayer bus configuration.

The other problems and novel features will become apparent from the description of the specification and appended drawings.

A semiconductor device according to an embodiment has a plurality of bus masters and a plurality of buses. The buses are coupled to the bus masters, respectively. The semiconductor device also has a plurality of memories. Each of the memories is coupled to at least any of the plurality of buses and includes at least one storage region. The semiconductor device also includes: a control device for controlling an access from each of the bus maters to any of the plurality of memories via the bus coupled to the bus master; and a storage device for storing a corresponding relation between identification information identifying each of the storage regions and a group to which the storage region belongs. The control device detects a use state of each of the storage regions, on the basis of an instruction of assuring a storage region used by any of the plurality of bus masters from the plurality of storage regions, with reference to a corresponding relation between a group designated by the instruction and the identification information from the corresponding relation, specifies one or more storage regions belonging to the designated group from the plurality of storage regions, assures the storage region to be used from the specified one or more storage regions on the basis of the detected use state, and outputs information for accessing the assured storage region to the bus master corresponding to the instruction.

A semiconductor device according to an embodiment can suppress the phenomenon that different bus maters simultaneously access the same memory (competition).

BRIEF DESCRIPTION OF THE DRAWINGS

FIG. 2 illustrates the data structure of a management table according to the related art.

FIG. 6 illustrates an example of the data structure of a management table according to the first embodiment.

FIG. 8 is a diagram illustrating use states in a management table according to an aspect.

FIG. 11 illustrates an example of the data structure of a management table according to the second embodiment.

FIG. 13 is a diagram illustrating use states in a management table according to an aspect.

FIG. 15 illustrates an example of the data structure of a management table according to the first modification.

FIG. 17 illustrates an example of the data structure of a management table according to the third embodiment.

DETAILED DESCRIPTION

Figure 1:
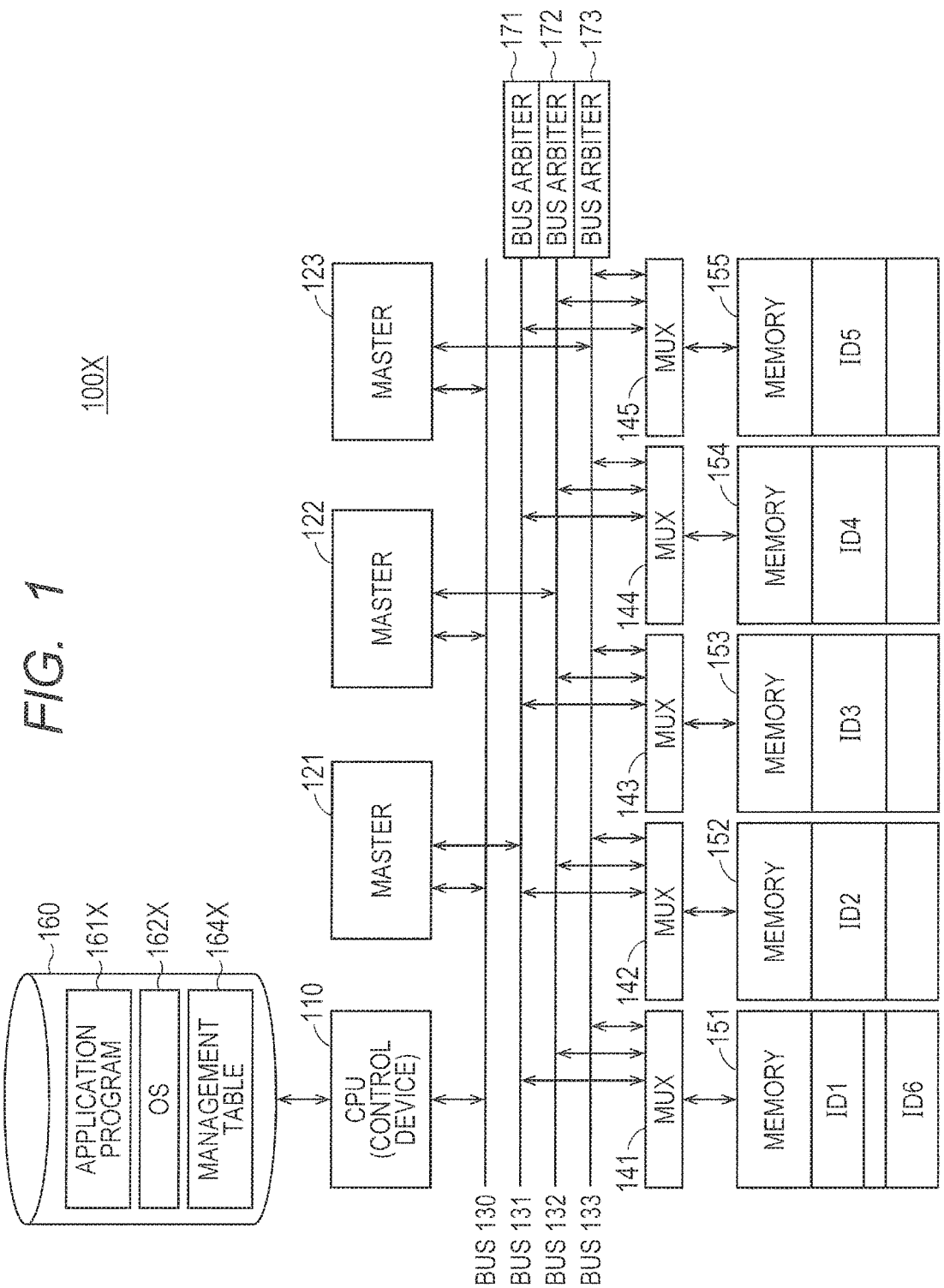
FIG. 1 is a diagram illustrating the configuration of a semiconductor device according to a related art.

Hereinafter, embodiments of the technical idea will be described in detail with reference to the drawings. In the following description, the same reference numerals are designated to the same parts. Since their names and functions are the same, the detailed description of them will not be repeated. The embodiments and modifications to be described below may be properly selectively combined.

First, the configuration and problems of a semiconductor device according to a related art will be described and, then, a semiconductor device according to an embodiment which can solve the problems will be described.

RELATED ART

Configuration of Semiconductor Device 100X

FIG. 1 is a diagram illustrating the configuration of a semiconductor device 100X according to a related art. Referring to FIG. 1, the semiconductor device 100X has a CPU (Central Processing Unit) 110 functioning as a control device which controls the entire operation of the device and masters 121 to 123 functioning as bus masters. The CPU 110 and the masters 121 to 123 are coupled via a bus 130.

The masters 121 to 123 can be, for example, DMACs (Direct Memory Access Controllers) or other CPUs.

The semiconductor device 100X further has a plurality of buses 131 to 133. The buses 131 to 133 are coupled to the masters 121 to 123, respectively. Concretely, the master 121 is coupled to the bus 131, the master 122 is coupled to the bus 132, and the master 123 is coupled to the bus 133.

Each of the buses 131 to 133 is coupled to multiplexers 141 to 145. The multiplexers 141 to 145 are coupled to memories 151 to 155 functioning as bus slaves, respectively. The buses 131 to 133 are controlled by bus arbiters 171 to 173. The bus arbiters 171 to 173 identify access requests from the masters 121 to 123 and determine any of the memories 151 to 155 to which an access request is to be sent.

On the basis of the access requests from the buses 131 to 133, each of the multiplexers 141 to 145 selects a bus so that any one of the buses and a corresponding memory are electrically coupled. When access requests are received from a plurality of buses at the same time, each of the multiplexers 141 to 145 selects anyone of the buses on the basis of priority in the multiplexers and electrically couples the bus to a corresponding memory. When an access to a selected bus is completed, each of the multiplexers 141 to 145 selects the next bus on the basis of the priority in the multiplexer, sequentially switches the buses having access requests, and electrically couples the bus and a corresponding memory.

Each of the memories 151 to 155 can be, for example, a large-capacity storage device such as a CD (Compact Disk), a DVD (Digital Versatile Disc), or an HDD (Hard Disk Drive), an SDRAM (Synchronous Dynamic Random Access Memory) used as a work region at the time of storing a program executed by the CPU and executing the program, or a memory device such as a flash memory.

Although each of the memories 151 to 155 is coupled to each of the buses 131 to 133 via the multiplexer in the above example, in another aspect, it may be coupled to at least any one of the buses 131 to 133. Each of the memories 151 to 155 includes at least one candidate region. The candidate region is a region which can be used by any of the plurality of masters 121 to 123 in all of the storage regions. Hereinbelow, a region used any of the plurality of masters 121 to 123 in the candidate regions is called a "process region".

That is, a process region belongs to a candidate region, and the candidate region belongs to all of storage regions of a memory.

As described above, the different buses 131 to 133 are coupled to the masters 121 to 123 of the semiconductor device 100X, and the memories 151 to 155 are coupled to each of the buses 131 to 133. As the semiconductor device 100X employs such a multilayer bus configuration, the plurality of masters (bus masters) can access the different memories (bus slaves) at the same time.

The semiconductor device 100X further has a storage device 160. The storage device 160 holds an application program (hereinbelow, simply called "application") 161X, a real-time operating system OS 162X, and a management table 164X. Hereinafter, the real-time operating system will be also simply called "OS". The application 161X operates on the OS 162X. The application 161X includes instructions for realizing a plurality of processes (tasks). The CPU 110 is configured so as to be accessible to the storage device 160. In another aspect, the control program 162X and the management table 164X may be stored in any of the memories 151 to 155. In such a case, the semiconductor device 100X does not have to have the storage device 160.

In an aspect, the application 161X notifies an instruction (system call) of assuring a process region necessary for the master to execute a task to (the kernel of) the OS 162X. The OS 162X assures a process region from any of a plurality of candidate regions in accordance with a system call. The OS 162X outputs information (for example, an address) for accessing the assured process region to the application 161X. The application 161X outputs the address to a master corresponding to the system call (that is, a master which executes the task) in the masters 121 to 123. The master accesses the process region on the basis of the input address and executes the task using the process region.

As described above, by executing the OS 162X, the CPU 110 functions as a control device controlling an access from each of the masters 121 to 123 to any of the plurality of memories 151 to 155 via the bus coupled to the master.

Process of Assuring Process Region by OS 162X According to Related Art

Next, with reference to FIGS. 2 and 3, the process of assuring a process region by the OS 162X will be described more concretely.

FIG. 2 illustrates the data structure of the management table 164X according to the related art. Referring to FIG. 2, the management table 164X holds the corresponding relations of the ID identifying each of a plurality of candidate regions, the address of the candidate region, and the use states of the candidate region. The use states include information identifying a task using a corresponding candidate region and the address of the process region used by the task.

In the example illustrated in FIGS. 1 and 2, the candidate region of ID "1" and the candidate region of ID "6" belong to the memory 151. The candidate region of ID "2" belongs to the memory 152. The candidate region of ID "3" belongs to the memory 153. The candidate region of ID "4" belongs to the memory 154. The candidate region of ID "5" belongs to the memory 155. In the example illustrated in FIG. 2, the candidate region of ID "1" is used by the tasks 1 and 2.

Figure 3:
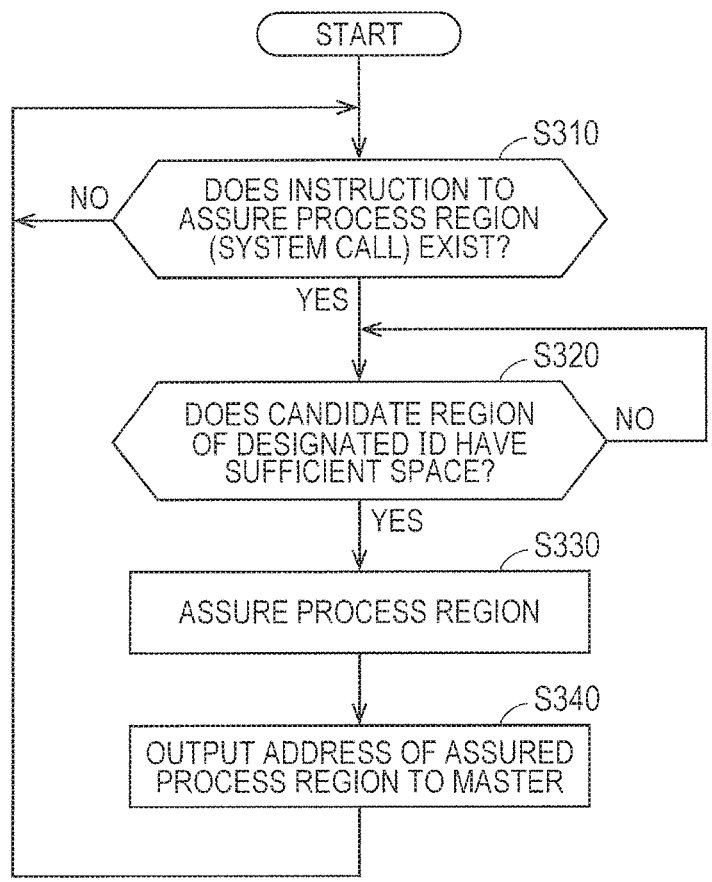
FIG. 3 is a flowchart illustrating processes of assuring a process region by the semiconductor device according to the related art.

FIG. 3 is a flowchart illustrating processes of assuring a process region by the semiconductor device 100X according to the related art. Each of the processes illustrated in FIG. 3 is realized when the CPU 110 executes the OS 162X or the application 161X.

In an aspect, at the time of executing a task, the application 161X notifies the OS 162X of an instruction (system call) to assure a process region used by any of the plurality of masters 121 to 123. More concretely, for each of the tasks of the application 161X, the ID identifying a candidate region is set. The application 161X notifies the OS 162X of a system call including the ID set for the task. In response to acceptance of the system call from the application 161X (YES in step S310), the OS 162X executes a process in step S320.

In step S320, the OS 162X determines whether the candidate region corresponding to the designated ID (ID included in the system call) has sufficient space or not. More concretely, referring to the management table 164X, on the basis of the use states of a candidate region corresponding to the designated ID, the CPU 110 executing the OS 162X calculates the capacity (free space) of a storage region which is not used by the task in the candidate region. When the calculated free space is equal to or larger than the capacity of the storage region necessary to execute the task, the CPU 110 determines that the candidate region corresponding to the designated ID has sufficient space.

When it is determined that the candidate region corresponding to the designated ID has sufficient space (YES in step S320), the OS 162X assures the process region in the free storage region. The OS 162X further registers information of the assured process region into the use states in the management table 164X.

On the other hand, when it is determined that the candidate region corresponding to the designated ID does not have sufficient space (NO in step S320), the OS 162X waits until the candidate region corresponding to the designated ID comes to have sufficient space.

In step S340, the OS 162X outputs the address of the assured process region to the application 161X. The application 161X outputs the address to a master (that is, member executing the task) corresponding to the instruction (system call) of step S310 in the plurality of masters 121 to 123. Consequently, the master executes the task using the assured process region.

When the task (process) by the master is finished, the application 161X notifies the fact to the OS 162X. In response to the notification, the OS 162X releases the assured process region. Further, the OS 162X deletes the information of the released process region from the use states in the management table 164X.

Competition which May Occur in Semiconductor Device 100X According to Related Art As described above, the OS 162X according to the related art assures the process region from the candidate region corresponding to the ID which is preliminarily set for each task. The ID is preliminarily set for each task by the developer of the application 161X. More concretely, the developer of the application 161X sets an ID for each task so that one memory is not used by a plurality of tasks. However, in some cases, IDs for tasks are not properly set.

Figure 4:
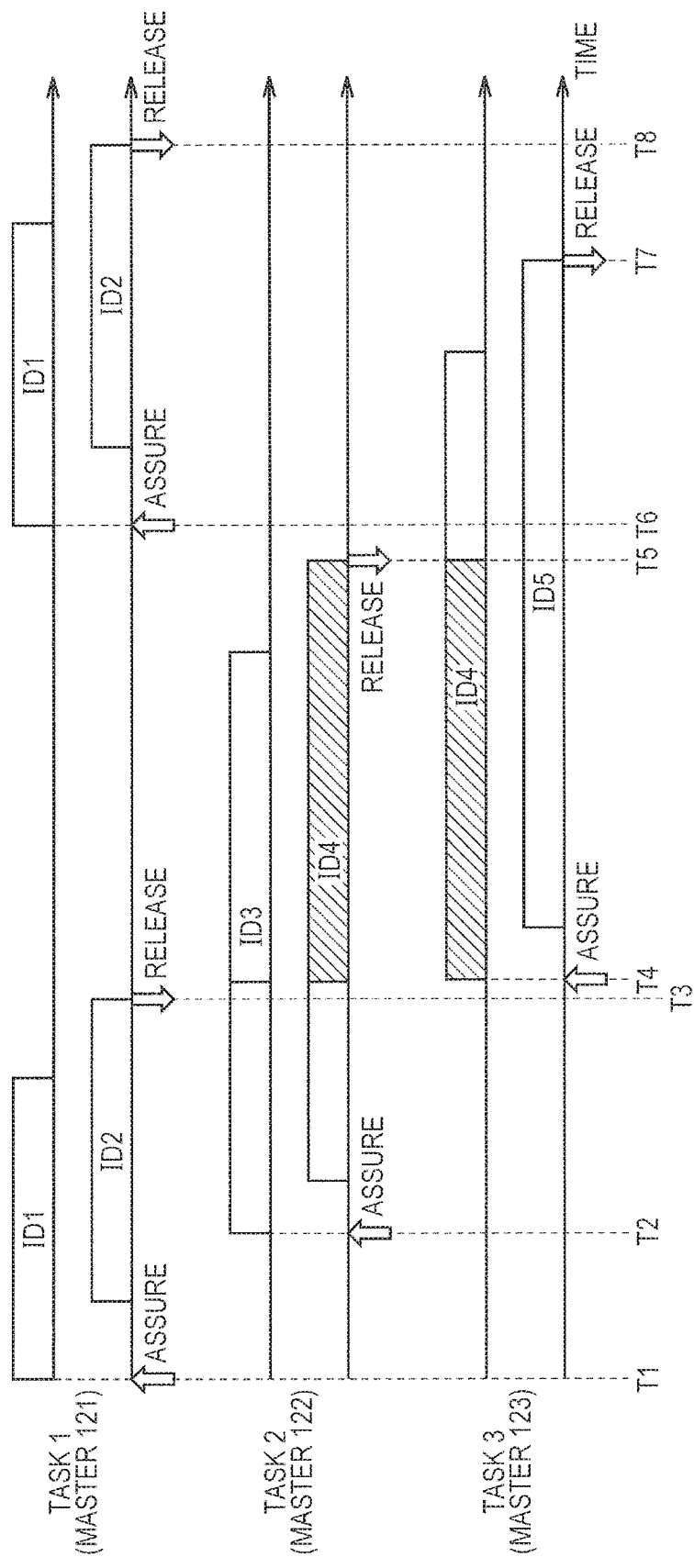
FIG. 4 is a diagram illustrating task scheduling of a real-time operating system according to the related art.

FIG. 4 is a diagram illustrating task scheduling of the OS 162X according to the related art. Referring to FIG. 4, the OS 162X assures (process regions belonging to) the candidate regions of ID "1" and ID "2" as storage regions necessary for the master 121 to execute task 1 between time T1 and time T3. The reason of assuring two candidate regions is for realization of pipeline process. It is not always necessary to assure a plurality of candidate regions.

Between time T2 and time T5, the OS 162X assures candidate regions of ID "3" and ID "4" as storage regions necessary for the master 122 to execute task 2. Between time T4 and time T7, the OS 162X assures candidate regions of ID "4" and ID "5" as storage regions necessary for the master 123 to execute task 3. Between time T6 and time T8, the OS 162X assures candidate regions of ID "1" and ID "2" as storage regions necessary for the master 121 to execute task 1.

In the above-described case, between time 14 and time T5 (hatched part), a plurality of masters (masters 122 and 123) are accessing the memory 154 corresponding to the ID "4". In an aspect, the OS 162X switches the members (masters) accessing the memory 154 corresponding to the ID "4" in time division manner in accordance with the priority or the like. In this case, time required for the tasks 2 and 3 becomes longer.

In another aspect, first, the OS 162X gives a right (bus possessory right) of accessing the memory corresponding to the ID "4" to a member (master) executing a task having higher priority as one of the members. After completion of the task, the OS 162X gives a right (bus possessory right) of accessing the memory corresponding to the ID "4" to the other task executing member. In this case, time required for a task having low priority becomes long.

As described above, in the semiconductor device 100X according to the related art, when IDs for tasks are not properly set, a plurality of tasks compete against one another, and time required for those tasks becomes long. Hereinafter, the configuration and control of a semiconductor device 100 according to an embodiment which can solve such a problem will be described.

First Embodiment

Outline

In an aspect, a plurality of candidate regions are set for a task in a first embodiment. Based on the use states of the plurality of candidate regions, a control device (OS 162) according to the first embodiment assures a process region in which occurrence of competition (delay) is suppressed in a plurality of candidate regions. A bus master executes a task by using the assured process region.

Configuration of Semiconductor Device 100

Figure 5:
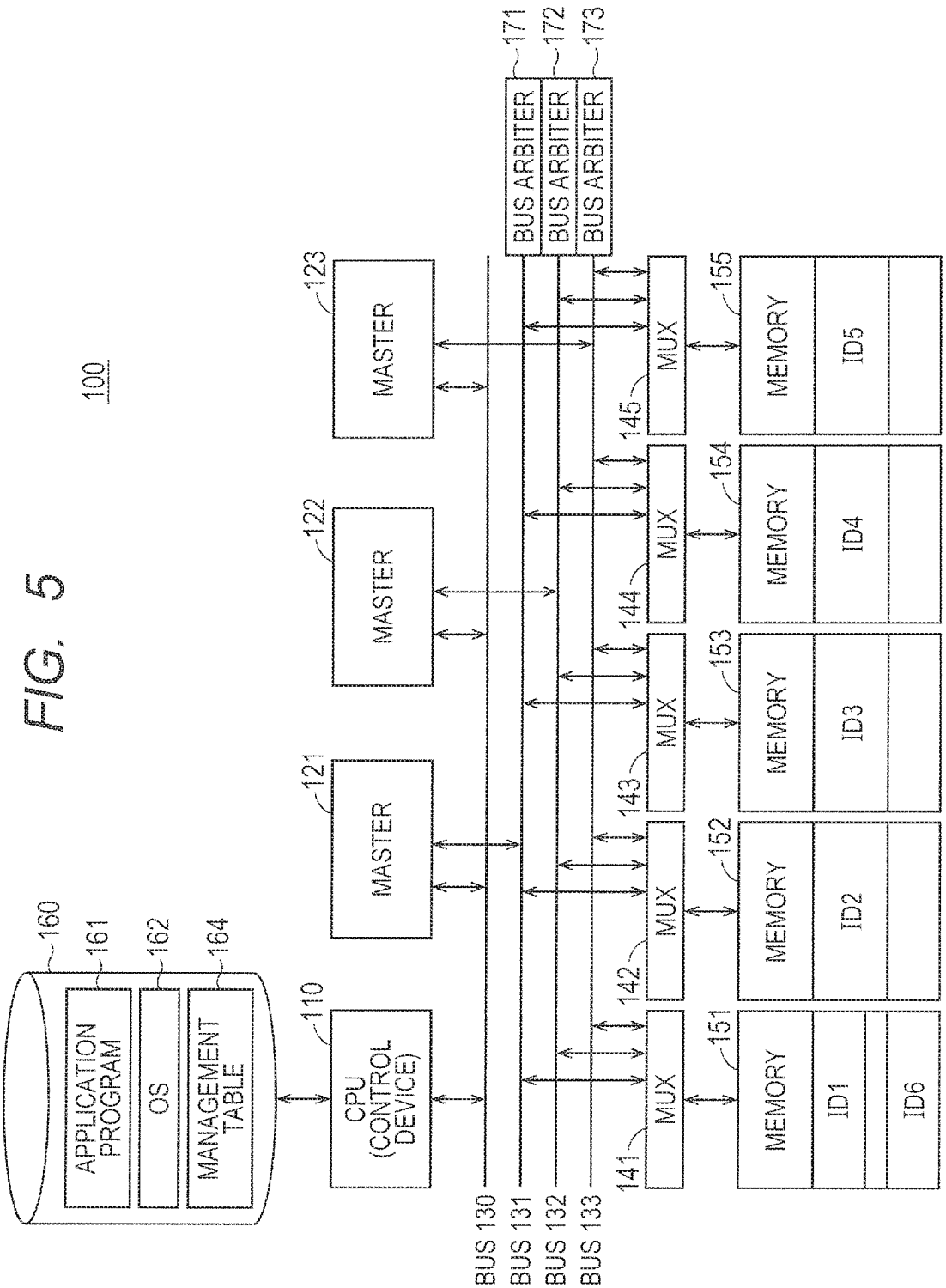
FIG. 5 is a diagram illustrating the configuration of a semiconductor device according to a first embodiment.

FIG. 5 is a diagram illustrating the configuration of the semiconductor device 100 according to the first embodiment. The hardware configuration of the semiconductor device 100 according to the first embodiment is the same as that of the semiconductor device 100X according to the related art. However, data stored in the storage device 160 according to the first embodiment is different from data stored in the storage device 160 according to the related art. Concretely, the storage device 160 according to the first embodiment holds an application 161, an OS 162, and a management table 164 in place of the application 161X, the OS 162X, and the management table 164X.

Management Table 164

FIG. 6 illustrates an example of the data structure of the management table 164. The management table 164 holds the corresponding relations of the ID identifying each of candidate regions, the address of the candidate region, group ID, and use states of the candidate region.

The group ID identifies a group to which a candidate region belongs. For each of tasks constructing the application 161X according to the related art, an ID is set. That is, a candidate region which is used is preliminarily set for each task. On the other hand, an ID or a group ID is set for each of tasks constructing the application 161 according to the first embodiment. For a task of designating an ID (hereinbelow, also called "ID task"), the OS 162 according to the first embodiment assures a process region from a candidate corresponding to the designated ID. For a task designating a group ID (hereinbelow, also called "GID task"), the OS 162 assures a process region from a candidate region belonging to a group specified by the designated group ID.

In an aspect, the developer of the application 161 sets a group ID for a task whose process time (bus occupation time) is long (for example, a task of receiving image data from a peripheral device coupled to a DMAC), and sets an ID for a task whose process time is short. The reason of the setting is to avoid large delay of a task end timing due to competition of tasks of long process time.

In another aspect, the developer of the application 161 sets a group ID of a group constructed by only one candidate region for a task which has to always avoid competition with other tasks. Consequently, a task to which an ID or a group ID corresponding to the one candidate region is set can avoid competition with other tasks.

In an aspect, priority may be set to each of tasks constructing the application 161. When a plurality of tasks compete against one another, the OS 162 gives bus possessory right preferentially to a master corresponding to a task having high priority.

The use states include information for identifying a task using a corresponding candidate region, the address of a process region used by the task, and a flag discriminating whether the task is an ID task or a GID task. As an example, the flag is set as "0" for an ID task and is set as "1" for a GID task.

In the example illustrated in FIGS. 5 and 6, candidate regions of ID "1", ID "2", ID "3", and ID "6" (the memories 151 to 153 to which the candidate regions belong) belong to a group of group ID "1", and candidate regions of ID "4" and ID "5" (the memories 154 and 155 to which the candidate regions belong) belong to a group of group ID "2".

The process region of the address "0x000 to 0x1FFF" in the candidate region of ID "1" is used by the task 1 designating a group ID. The process region of the address "0x2000 to 0x3FFF" in the candidate region of ID "1" is used by the task 2 designating an ID.

The group ID corresponding to each candidate region is set, for example, by the developer of the OS 162. The developer sets a group ID in consideration of the characteristic (for example, transfer speed) of a memory and a bus configuration. For example, a group ID is set so that a plurality of memories having almost same transfer speed belong to the same group. For example, a group ID is set so that a plurality of memories which can be accessed from a task executing member (master) without a bus bridge belong to the same group. In such a manner, the semiconductor device 100 can suppress variations in time required for a GID task.

Control Structure

Figure 7:
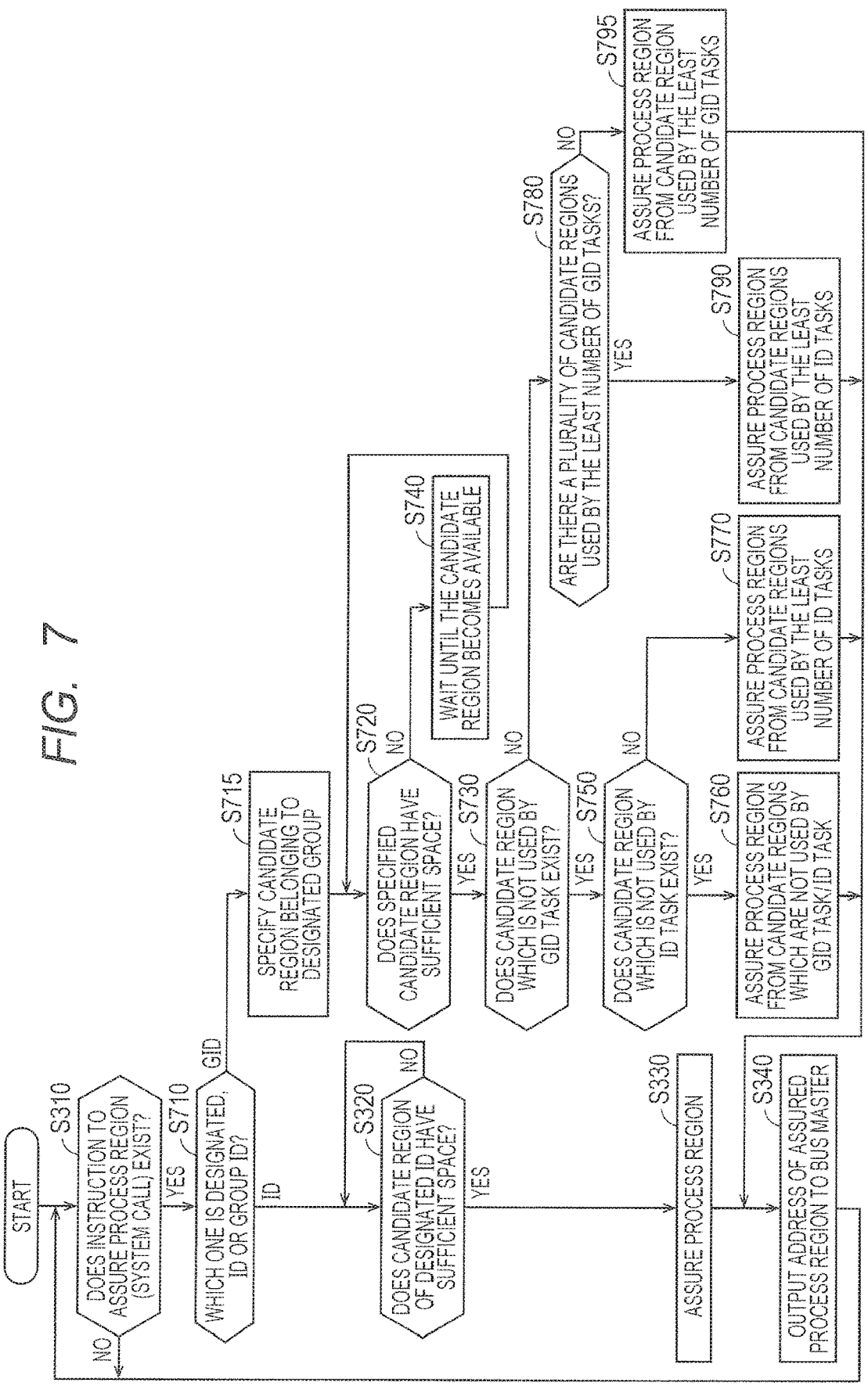
FIG. 7 is a flowchart illustrating processes of assuring a process region by the semiconductor device according to the first embodiment.

FIG. 7 is a flowchart illustrating processes to assure a process region by the semiconductor device 100 according to the first embodiment. Each of the processes illustrated in FIG. 7 is realized when the CPU 110 executes the OS 162 or the application 161.

In an aspect, at the time of executing a task, the application 161 notifies the OS 162 of an instruction (system call) to assure a process region. At this time, the application 161 notifies the OS 162 of a system call including an ID or a group ID which is set for the task. In response to reception of the system call from the application 161 (YES in step S310), the OS 162 executes a process of step S710.

In step S710, the OS 162 determines which one of an instruction to assure a process region designating an ID and an instruction to assure a process region designating a group ID is received. When it is determined that an instruction to assure a process region designating a group ID is received (group ID in step S710), the OS 162 executes the process of step S715. On the other hand, when it is determined that an instruction to assure a process region designating an ID is received (ID in step S710), the OS 162 executes the processes of steps S320 to S340. Since the processes of steps S320 to S340 are the same as the above-described processes, the description will not be repeated.

In step S715, the OS 162 specifies a candidate region belonging to the group of the designated group ID with reference to the management table 164. The OS 162 further specifies one or more process regions from the specified candidate region on the basis of the use states of the candidate region held in the management table 164 (steps S720 to S795).

In step S720, the OS 162 determines whether a candidate region having sufficient free space exists or not in the specified candidate regions with reference to the use states in the management table 164. For example, the OS 162 determines that a candidate region having free space equal to or larger than space of a storage region necessary to execute a task is a candidate region having sufficient free space. When it is determined that a candidate region having sufficient free space exists (YES in step S720), the OS 162 executes the process of step S730.

When it is determined that a candidate region having sufficient free space does not exist (NO in step S720), the OS 162 waits until any of candidate regions comes to have sufficient free space (step S740).

There is a task which is requested to be processed in a real-time manner, that is, cannot wait (for example, motor control process). In such a case, the OS 162 may assure a process region which is used by a task input in step S310 by temporarily stopping a task whose priority is low and which is being executed.

In step S730, the OS 162 determines whether a candidate region which is not used by a GID task exists or not in candidate regions specified in step S720. For example, the OS 162 determines whether a candidate region which is not used by the task of the flag "1" exists in the candidate regions specified in the step S720 or not with reference to the use states in the management table 164. In the case where it is determined that a candidate region which is not used by a GID task exists (YES in step S730), the OS 162 executes the process in step S750. In the other case (NO in step S730), the OS 162 executes the process of step S780.

In step S750, the OS 162 determines whether a candidate region which is not used by an ID task in candidate regions which are not used by a GID task exists or not. In other words, the OS 162 determines whether a candidate region which is not used at all by a task exists or not. For example, the OS 162 determines whether a candidate region which is not used by the task of the flag "0" exists in the candidate regions which are not used by a GID task with reference to the use states in the management table 164. When it is determined that a candidate region which is not used at all by a task exists (YES in step S750), the OS 162 assures a process region in the candidate region (step S760). On the other hand, when it is determined that a candidate region which is not used at all by a task does not exist (NO in step S750), the OS 162 assures a process region from a candidate region which is used by the least number of ID tasks (step S770). After assuring the process region, the OS 162 registers information of the process region into the use states in the management table 164.

In step S780, the OS 162 determines whether a plurality of candidate regions used by the least number of GID tasks exist or not in the candidate region specified in the step S720. When it is determined that a plurality of candidate regions used by the least number of GID tasks exist (YES in step S780), the OS 162 executes the process of step S790. In the other case (NO in step S780), the OS 162 executes the process of step S795.

In step S790, the OS 162 assures a process region from a candidate region used by the least number of ID tasks in the plurality of candidate regions specified in step S780. In step S795, the OS 162 assures a process region from one candidate region specified in step S780. After the steps S760, S770, S790, and S795, the OS 162 executes the process of step S340.

Next, a concrete example will be described with reference to FIG. 8. FIG. 8 is a diagram illustrating use states in the management table 164 according to an aspect. It is assumed that an instruction to assure a process region designating the group ID "1" is input to the OS 162 in the case of the use states illustrated in FIG. 8. In this case, first, the OS 162 specifies the candidate regions of the IDs "1", "2", "3", and "6" corresponding to the group ID "1" (step S715). It is assumed that each of the candidate regions has sufficient free space. Subsequently, the OS 162 determines that the candidate regions are used by the GID task (task of the flag "1") (NO in step S730).

Further, the OS 162 counts the number of GID tasks every specified candidate region. The candidate region of the ID "1" is used by two GID tasks, and each of the candidate regions of the IDs "2", "3", and "6" is used by one GID task. Consequently, the OS 162 specifies the candidate regions of the IDs "2", "3", and "6" as candidate regions used by the least number of the GID task (YES in step S780).

Subsequently, the OS 162 extracts the candidate regions of the IDs "3" and "6" as candidate regions which are not used by an ID task from the candidate regions of the IDs "2", "3", and "6". The OS 162 assures one or more process regions from the extracted candidate regions (step S790).

Figure 9:
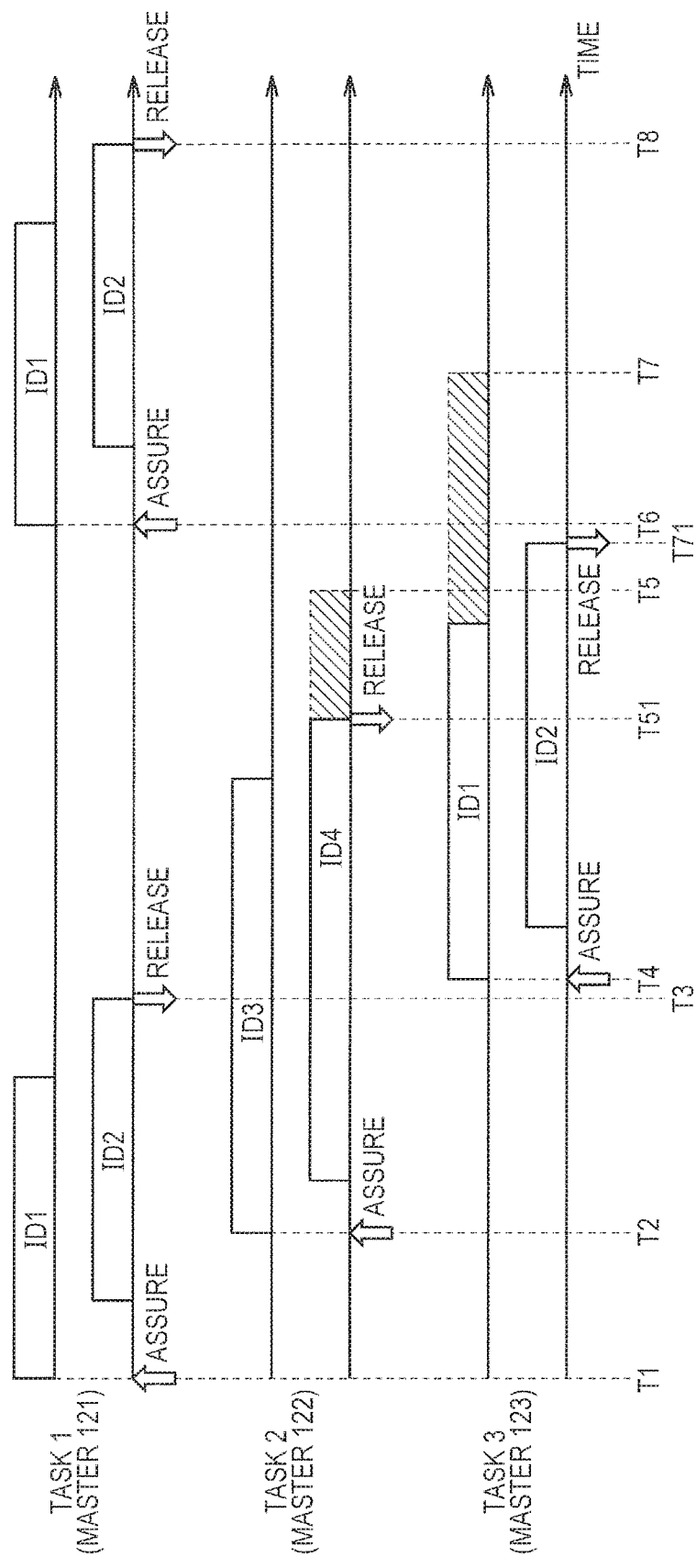
FIG. 9 is a diagram illustrating task scheduling of a real-time operating system according to the first embodiment.

FIG. 9 is a diagram illustrating task scheduling of the OS 162 according to the first embodiment. In FIG. 9, it is assumed that the timings (time T1, T2, T4, and T6) when the system calls corresponding to the tasks 1 to 3 are input are the same as those in the example illustrated in FIG. 4. Hereinafter, the difference point between the task scheduling of the OS 162 according to the first embodiment and the task scheduling of the OS 162X according to the related art descried with reference to FIG. 4 will be described.

The OS 162 according to the first embodiment receives a system call including estimation of the group ID from the application 161 at time T4. The OS 162 assures (process regions belonging to) candidate regions of the IDs "1" and "2" which are not used by a GID task and an ID task at time 14 from the candidate regions belonging to the designated group ID (group) (step S760).

By the operation, the semiconductor device 100 according to the first embodiment can suppress competition among tasks by the masters 122 and 123 which occurs in the example illustrated in FIG. 4. As a result, time required for the task 2 is shortened from time between T2 to T5 to time between T2 to T51. Time required for the task 3 is also shortened from time between 14 to T7 to time between 14 to T71.

According to the above, the semiconductor device 100 according to the first embodiment specifies a candidate which is not used at all or not used so much by another task from candidate regions belonging to a group which is set for a task, and assures a process region from the specified candidate region. Therefore, the semiconductor device 100 can suppress delay of the end timing of a task.

Since the semiconductor device 100 can suppress delay in the end timing of a task, high-level real-time process can be realized. Moreover, since the semiconductor device 100 can suppress time required for a task, the power consumption can be reduced.

Although the developer of the application 161X according to the related art has to set an ID for a task with an awareness that a plurality of tasks do not compete, it is sufficient for the developer of the application 161 according to the first embodiment to set a group ID according to a master executing a task to a task.

The semiconductor device 100 is constructed so as to preferentially assure a process region from a candidate region which is not used by a GID task. Consequently, the semiconductor device 100 can suppress competition of GID tasks (tasks of long process time). As a result, the semiconductor device 100 can suppress large delay of the end timing of a task.

Second Embodiment

The semiconductor device 100 according to the first embodiment is constructed to suppress competition of tasks by using a candidate region and a group to which the candidate region belongs. However, when a plurality of candidate regions are set for one memory, competition among tasks may occur.

Referring to FIG. 5, for the memory 151, the candidate regions of the ID "1" and the ID "6" are set. For example, regardless of the fact that the candidate region of the ID "1" is used by the master 121, the OS 162 assures the candidate region of the ID "6" for the master 122. In this case, the task executed by the master 121 and the task executed by the master 122 compete, and time required for the tasks increases.

A semiconductor device 100A according to a second embodiment suppresses the competition by using identification information (hereinbelow, also called "slave ID") identifying a memory. Hereinafter, a concrete configuration and control will be described.

Configuration of Semiconductor Device 100A

Figure 10:
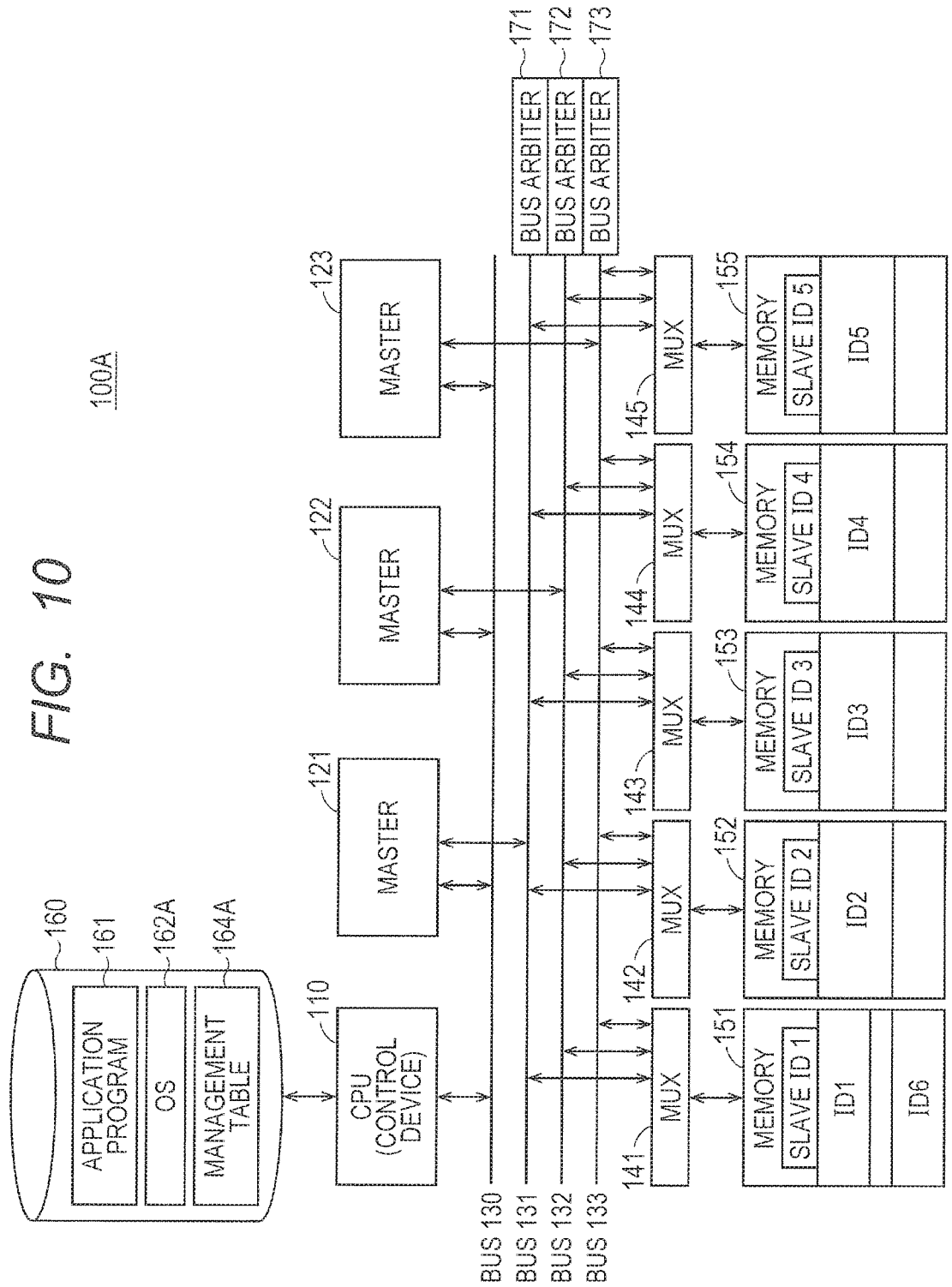
FIG. 10 is a diagram illustrating the configuration of a semiconductor device according to a second embodiment.

FIG. 10 is a diagram illustrating the configuration of the semiconductor device 100A according to the second embodiment. The hardware configuration of the semiconductor device 100A according to the second embodiment is the same as that of the semiconductor device 100 according to the first embodiment. However, data stored in the storage device 160 according to the second embodiment and data stored in the storage device 160 according to the first embodiment are different. Concretely, the storage device 160 according to the second embodiment holds an OS 162A and a management table 164A in place of the OS 162 and the management table 164.

Management Table 164A

FIG. 11 illustrates an example of the data structure of the management table 164A. The management table 164A holds the data held in the management table 164 according to the first embodiment and, in addition, slave IDs identifying the plurality of memories 151 to 155. In the example of FIGS. 10 and 11, the slave ID "1" indicates the memory 151, the slave ID "2" indicates the memory 152, the slave ID "3" indicates the memory 153, the slave ID "4" indicates the memory 154, and the slave ID "5" expresses the memory 155. In the example of FIG. 11, the candidate regions of the IDs "1" and "6" belong to the memory 151 of the slave ID "1". Consequently, the semiconductor device 100A according to the second embodiment can grasp that a plurality of candidate regions belong to the same memory.

Control Structure

Figure 12:
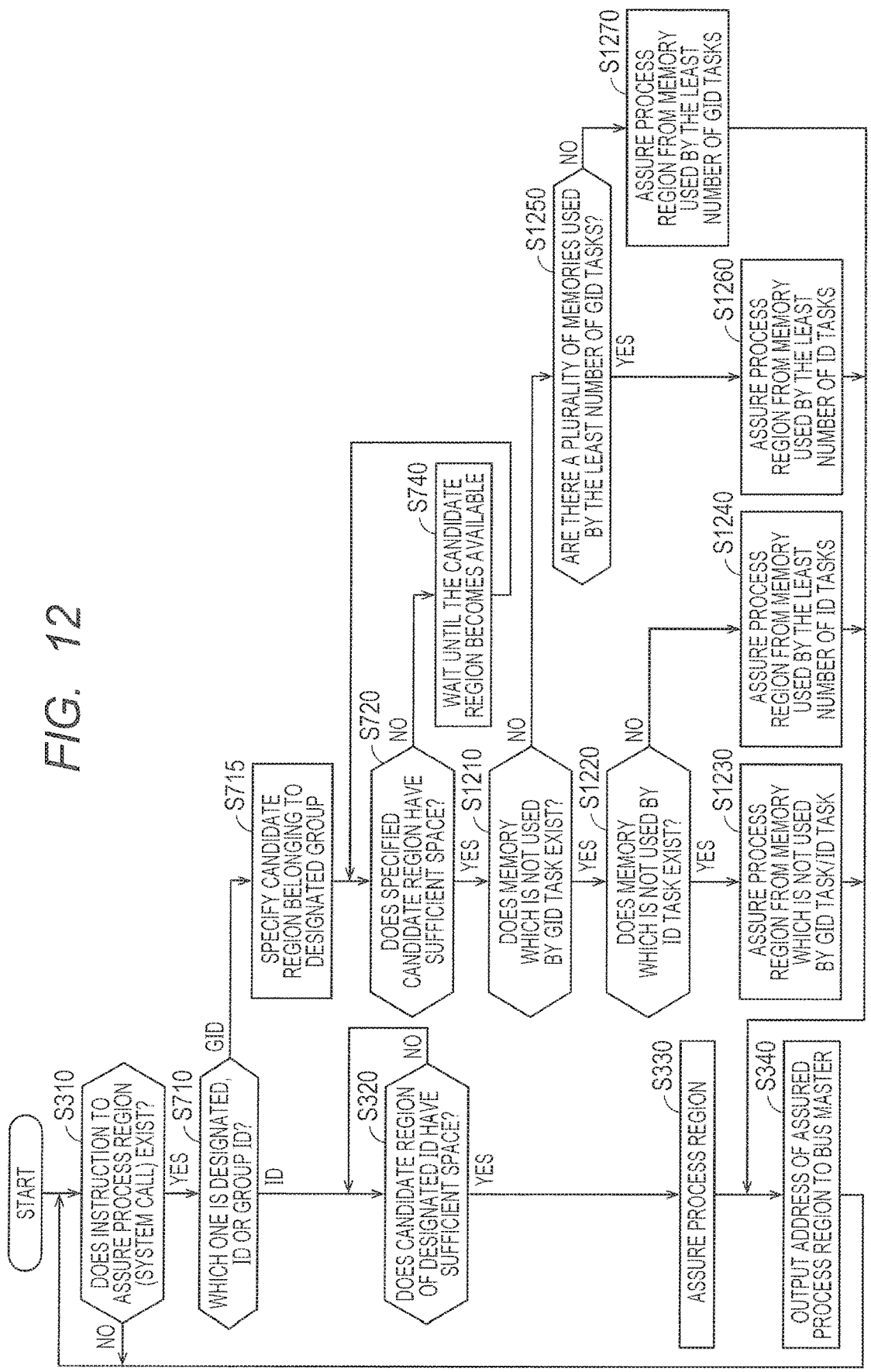
FIG. 12 is a flowchart illustrating processes of assuring a process region by the semiconductor device according to the second embodiment.

FIG. 12 is a flowchart illustrating processes to assure a process region by the semiconductor device 100A according to the second embodiment. Each of the processes illustrated in FIG. 12 is realized when the CPU 110 executes the OS 162A or the application 161. The same reference signs are designated to the same processes in FIG. 12 as the above-described processes. The description of the processes will not be repeated.

When a candidate region having sufficient free space exists in the candidate regions specified in step S715 (YES in step S720), the OS 162A executes the process of step S1210.

In step S1210, the OS 162A detects (the slave ID) of a memory to which the candidate region having sufficient free space belongs with reference to the management table 164A. Further, the OS 162A determines whether or not a memory which is not used by a GID task exists in the detected memories. For example, the OS 162A determines whether a memory which is not used by a task of the flag "1" exists in the detected memories with reference to the use states in the management table 164A. When it is determined that a memory which is not used by a GID task exists (YES in step S1210), the OS 162A executes the process of step S1220. In the other case (NO in step S1210), the OS 162A executes the process of step S1250.

In step S1220, the OS 162A determines whether a memory which is not used by an ID task exists in the memories which are not used by a GID task. In other words, the OS 162A determines whether there is a memory which is not used by any of tasks. For example, the OS 162A determines whether a memory which is not used by a task of the flag "0" exists in the memories which are not used by a GID task with reference to the use states in the management table 164A. When a memory which is not used at all by tasks exists (YES in step S1220), the OS 162A assures a process region from a candidate region belonging to the memory (step S1230). On the other hand, when a memory which is not used at all by tasks does not exist (NO in step S1220), the OS 162A assures a process region from a memory used by the least number of ID tasks (step S1240). After assuring the process region, the OS 162A registers information of the process region into the use states in the management table 164A.

In step S1250, the OS 162A determines whether or not a plurality of memories used by the least number of GID tasks exist in the memories detected in step S1210 (the memories to which a candidate region having sufficient free space belongs). In the case where it is determined that a plurality of candidate regions used by the least number of GID tasks exist (YES in step S1250), the OS 162A executes the process of step S1260. In the other case (NO in step S1250), the OS 162A executes the process of step S1270.

In step S1260, the OS 162A assures a process region from the candidate region belonging to the memory used by the least number of ID tasks from the plurality of memories specified in step S1250. In step S1270, the OS 162A assures a process region from one or more candidate regions specified in step S1250. After the steps S1230, S1240, S1260, and S1270, the OS 162A executes the process of step S340.

A concrete example will be described with reference to FIG. 13. FIG. 13 is a diagram illustrating use states in the management table 164A according to an aspect. The use states illustrated in FIG. 13 and those illustrated in FIG. 8 are the same. It is assumed that an instruction to assure a process region designating the group ID "1" is input to the OS 162A in the use states illustrated in FIG. 13. In this case, first, the OS 162A specifies the candidate regions of the IDs "1", "2", "3", and "6" corresponding to the group ID "1" (step S715). It is assumed that all of the candidate regions have sufficient free space. Subsequently, the OS 162A determines that all of the memories 151 to 153 of the slave IDs "1" to "3" corresponding to the candidate regions are being used by a GID task (the task of the flag "1") (NO in step S1210).

Furthermore, the OS 162A counts the number of GID tasks for each of the specified memories. The memory 151 of the slave ID "1" is used by three GID tasks, and each of the memories 152 and 153 of the slave IDs "2" and "3" is used by one GID task. Consequently, as memories used by the least number of GID tasks, the OS 162A specifies the memories 152 and 153 of the slave IDs "2" and "3" (YES in step S1250).

Subsequently, the OS 162A extracts the memory 153 of the slave ID "3" as a memory which is not used by an ID task from the memories 152 and 153 of the slave IDs "2" and "3". The OS 162A assures a process region from the extracted memory 153 (step S1260).

As described above, by using information identifying a memory (slave ID), the semiconductor device 100A according to the second embodiment can suppress competition among tasks more than the semiconductor device 100 according to the first embodiment.

Modification 1

The semiconductor device 100 according to the first embodiment and the semiconductor device 100A according to the second embodiment have a simple configuration which does not include a bus bridge. The configuration of a semiconductor device having a bus bridge will be also described.

Figure 14:
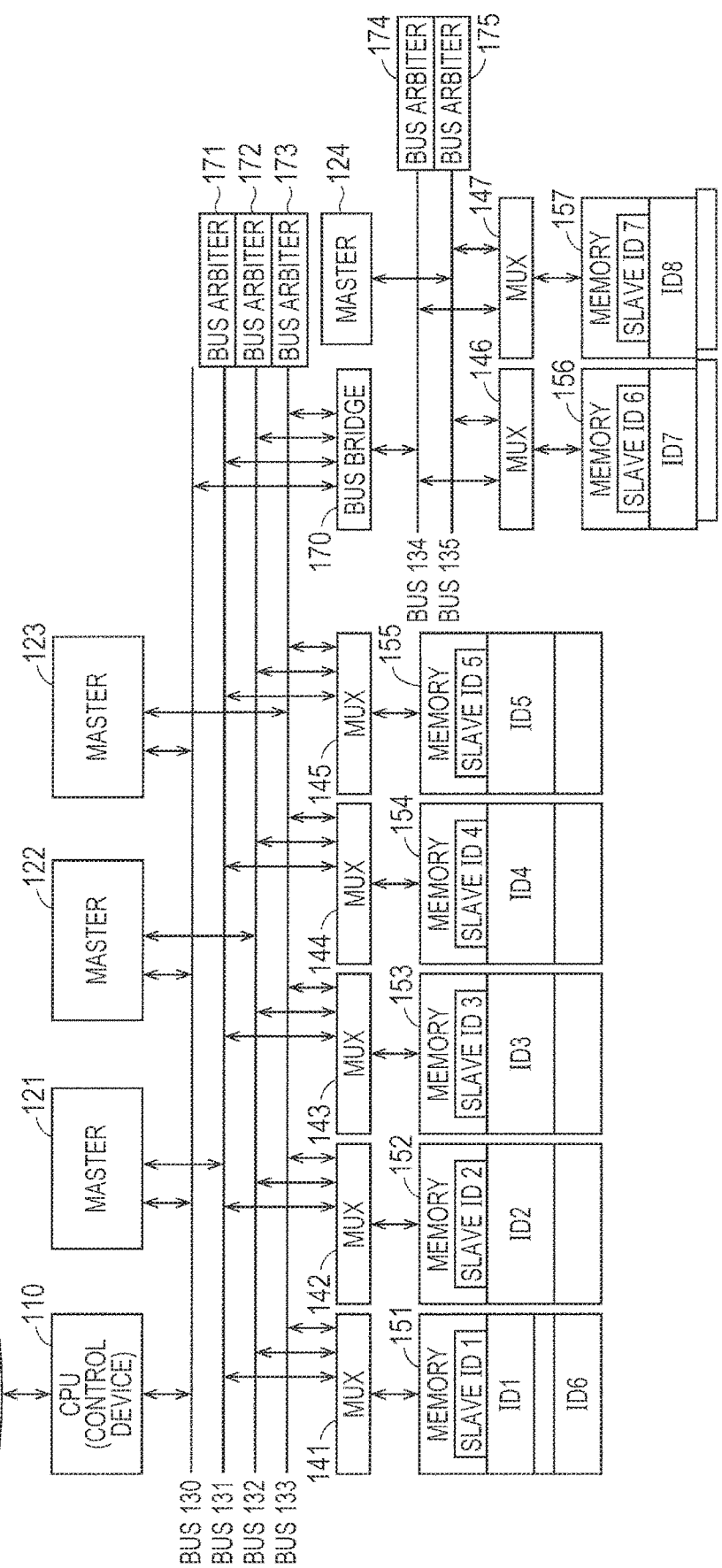
FIG. 14 is a diagram for explaining the configuration of a semiconductor device according to a first modification.

FIG. 14 is a diagram for explaining the configuration of a semiconductor device 100B according to modification 1. The semiconductor device 100B is different from the semiconductor device 100A according to the second embodiment with respect to the point that a bus bridge 170, a master 124, buses 134 and 135, multiplexers 146 and 147, memories 156 and 157, and bus arbiters 174 and 175 are further provided.

The bus bridge 170 relays the buses 130 to 133 and the bus 134. The master 124 is coupled to the bus 135. Each of the buses 134 and 135 is coupled to the multiplexers 146 and 147. The multiplexer 146 is coupled to the memory 156, and the multiplexer 147 is coupled to the memory 157. The buses 134 and 135 are controlled by the bus arbiters 174 and 175, respectively. The bus arbiters 174 and 175 identify access requests from the masters 121 to 124 and determine one of the memories 156 and 157 to which an access request is sent.

Each of the multiplexers 146 and 147 selects a bus so that any of buses and a corresponding memory are electrically coupled on the basis of the access request from the bus 134 or 135. When access requests are received simultaneously from the buses 134 and 135, each of the multiplexers 146 and 147 selects one of the buses on the basis of the priority in the multiplexer and electrically couples the bus and the corresponding memory. When an access to the selected bus is completed, each of the multiplexers 146 and 147 selects the next bus on the basis of the priority in the multiplexer, sequentially switches buses having access requests, and electrically couples the bus and a corresponding memory.

In the configuration, the masters 121 to 123 can access the memories 156 and 157 via the bus bridge 170, and the master 124 can access the memories 151 to 155 via the bus bridge 170. The storage device 160 holds an application 161B, the OS 162A described in the second embodiment, and a management table 164B. For each of tasks constructing the application 161B, in a manner similar to the above-described application 161, an ID or a group ID is set.

Using the CPU 110 as a reference, the preceding stage of the bus bridge 170 is defined as a first layer, and the succeeding stage of the bus bridge 170 is defined as a second layer. In this case, the masters 121 to 123 existing in the first layer can quickly access the memories 151 to 155 existing in the same first layer. On the other hand, when the masters 121 to 123 access the memories 156 and 157 existing in the second layer, delay occurs in the bus bridge 170.

Similarly, the master 124 existing in the second layer can quickly access the memories 156 and 157 existing in the same second layer. However, when the master 124 accesses the memories 151 to 155 existing in the first layer, delay occurs in the bus bridge 170.

FIG. 15 illustrates an example of the data structure of the management table 164B. In the example illustrated in FIGS. 14 and 15, to the group of the group ID "1", the memories 151 to 155 (slave IDs "1" to "5") existing in the first layer belong. To the group of the group ID "3", the memories 156 and 157 belonging to the second layer (slave IDs "6" and "7") belong. In such a manner, in an aspect, the group ID set for each memory is set so that memories existing in the same layer belong. That is, group IDs set for the memories are set so that access speeds from the master (the task execution member) to memories belonging to the group become equal. To the group of the group ID "2", the memories 151 to 157 belong.

In an aspect, the developer of the application 161B sets the group ID "1" of the group to which the memories 151 to 155 belong to a task executed by the masters 121 to 123. The developer sets the group ID "3" of the group to which the memories 156 and 157 belong to a task executed by the master 124. By the settings, delay in the end timing of a task and variation in time required for a task are suppressed.

In some cases, a task does not require real-time action. In such a case, the developer of the application 161B can set the group ID "2" of the group to which the memories 151 to 157 belong to the task.

The control structure that the semiconductor device 100B assures a process region is the same as the control structure that the semiconductor device 100A assures a process region. Consequently, the description of the control structure that the semiconductor device 100B assures a process region will not be repeated.

Modification 2

The management table 164A is configured to hold corresponding relations of an ID identifying a candidate region, a slave ID identifying a memory, and a group ID identifying a group. In another aspect, the management table may be configured to hold corresponding relations of a slave ID identifying a memory and a group ID identifying a group to which a memory belongs.

In such a case, any of a slave ID and a group ID is set for each task. An OS reads a slave ID or group ID set for each task. When a slave ID is set for a task, the OS assures a process region from a memory corresponding to the slave ID.

On the other hand, when a group ID is set for a task, the OS specifies a memory of the slave ID belonging to the group of the group ID and, further, specifies a memory having sufficient free space. After that, the OS reads the "ID task" as a "task of designating a slave ID" and executes the above-described processes of S1210 to S1270, thereby assuring a process region.

By the above, in the semiconductor device according to Modification 2, the space necessary to store a management table can be reduced as compared with the management table 164A.

Third Embodiment

A semiconductor device 100C according to a third embodiment assures a process region on the basis of the corresponding relation between a slave ID identifying a memory and a group ID identifying a group to which a memory belongs.

Configuration of Semiconductor Device 100C

Figure 16:
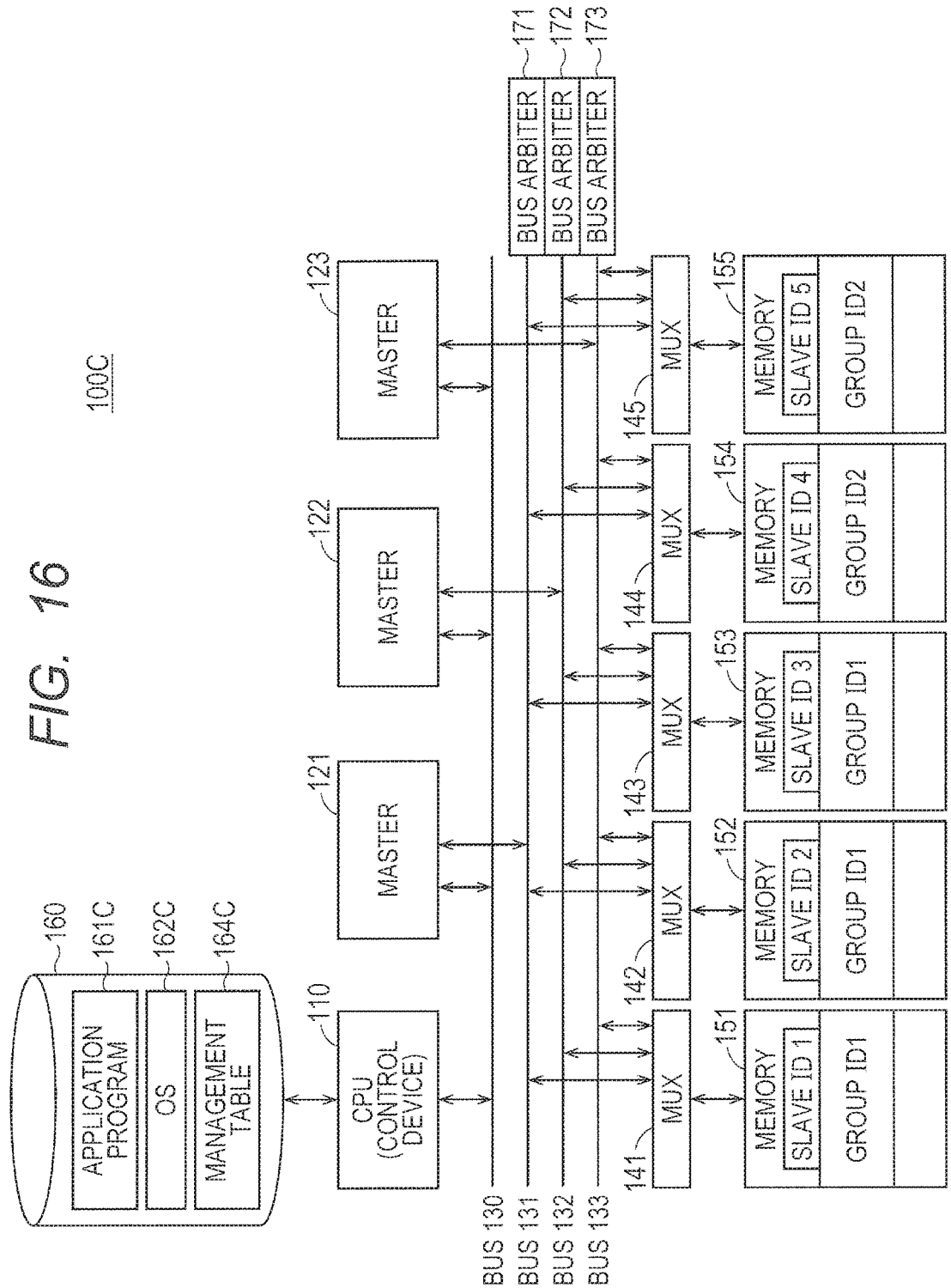
FIG. 16 is a diagram illustrating the configuration of a semiconductor device according to a third embodiment.

FIG. 16 is a diagram illustrating the configuration of the semiconductor device 100C according to the third embodiment. The hardware configuration of the semiconductor device 100C according to the third embodiment is the same as that of the semiconductor device 100 according to the second embodiment. Data stored in the storage device 160 according to the third embodiment is different from that stored in the storage device 160 according to the second embodiment. Concretely, the storage device 160 according to the third embodiment holds an application 161C, an OS 162C, and a management table 164C in place of the application 161A, the OS 162A, and the management table 164A.

Management Table 164C

FIG. 17 illustrates an example of the data structure of the management table 164C. The management table 164C stores the corresponding relations of a slave ID identifying each of the memories 151 to 155, a group ID identifying a group to which of the memories 151 to 155 belong, the address of a candidate region in each of the memories 151 to 155, and use states in each of the memories 151 to 155.

In each of tasks constructing the application 161C, a group ID is set and a slave ID is not set. Consequently, the management table 164C does not hold a flag discriminating a slave ID or a group ID which is set in a task.

Control Structure

Figure 18:
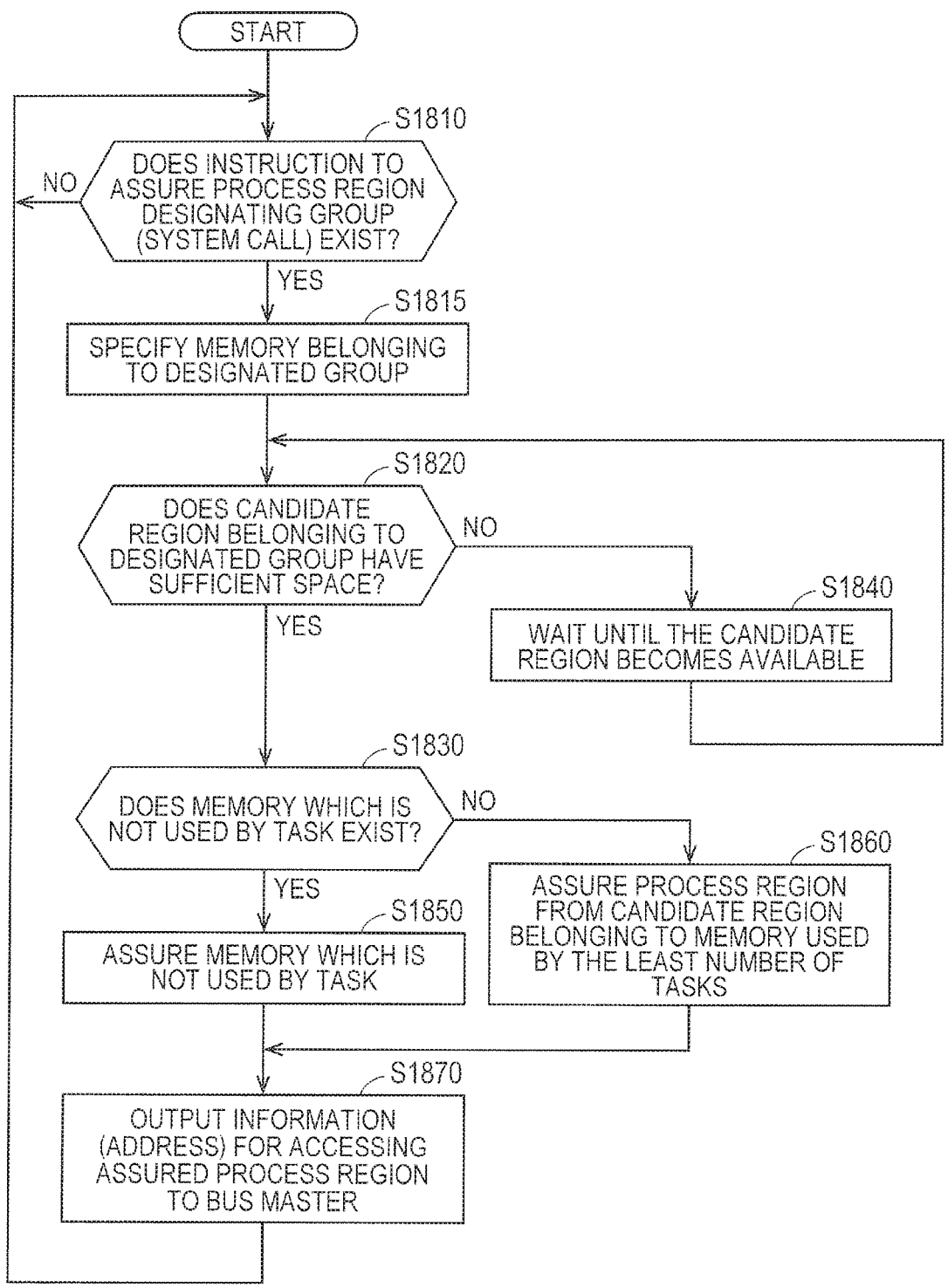
FIG. 18 is a flowchart illustrating processes of assuring a process region by the semiconductor device according to the third embodiment.

FIG. 18 is a flowchart illustrating processes of assuring a process region by the semiconductor device 100C according to the third embodiment. Each of the processes illustrated in FIG. 18 is realized when the CPU 110 executes the OS 162C or the application 161C.

Based on the reception of an instruction (system call) of instructing a process region designating a group ID from the application 161C (YES in step S1810), the OS 162C executes the process of step S1815.

In step S1815, the OS 162C specifies a memory belonging to a designated group ID with reference to the management table 164C.

In step S1820, the OS 162C determines whether the candidate region of the memory belonging to the group specified by the designated group ID has sufficient free space or not. More concretely, the OS 162C makes the determination on the basis of the use states of the memory belonging to the designated group ID in the use states of memories held in the management table 164C. Since the method of determining whether the memory has sufficient free space is the same as that of step S720, its description will not be repeated.

In the case where the candidate region of the specified memory has sufficient free space (YES in step S1820), the OS 162C executes the process of step S1830. In the other case (NO in step S1820), the OS 162C waits until the specified memory comes to have sufficient free space (step S1840).

In step S1830, the OS 162C determines whether or not a memory which is not used by a task (GID task) exists in memories to which the candidate region having sufficient free space belongs. In the case where a memory which is not used by a task exists (YES in step S1830), the OS 162C assures a process region in the candidate region belonging to the memory (step S1850). On the other hand, in the case where a memory which is not used by a task does not exist (NO in step S1830), the OS 162C assures a process region from a candidate region belonging to a memory used by the least number of tasks (step S1860). After assuring the process region, the OS 162C registers information of the process region into the use states in the management table 164C.

In step S1870, the OS 162C outputs the address of the process region as information to access the assured process region to a master corresponding to the system call via the application 161C.

By the above, the semiconductor device 100C according to the third embodiment specifies a memory which is not used at all or not used so much by other tasks from memories belonging to a group and assures a process region from (a candidate region belonging to) the specified memory. Therefore, the semiconductor device 100C can suppress competition among tasks.

The management table 164C according to the third embodiment does not have an ID identifying a candidate region and a flag. Consequently, the storage capacity necessary to store the management table 164C is smaller than that necessary to store the management table according to the first and second embodiments.

The semiconductor device 100C can control so that the use ratios of a plurality of memories belonging to the same group are not biased. Therefore, the semiconductor device 100C can suppress competition among a plurality of tasks.

In another aspect, the management table 164C may not hold the address of a candidate region. In this case, the OS 162C handles all of storage regions of one memory as candidate regions.

Configurations

The technical features disclosed above can be summarized as follows.

Configuration 1

According to an embodiment, a semiconductor device has a plurality of masters 121 to 123 and a plurality of buses 131 to 133. The buses are coupled to the masters, respectively. The semiconductor device further includes a plurality of memories 151 to 155. Each of the memories is coupled to at least any of the plurality of buses. Each memory includes at least one candidate region. The semiconductor device further includes: a CPU 110 for controlling an access from each of the maters to any of the plurality of memories via the bus coupled to the bus; and a storage device 160 for storing a management table 164 holding a corresponding relation between an ID identifying each of the candidate regions and a group ID identifying a group to which the candidate region belongs. By executing an OS 162, the CPU 110 executes the following processes. The CPU 110 detects a use state of each of the candidate regions. Based on the fact that an instruction (system call) of assuring a process region used by any of the plurality of masters from the plurality of candidate regions (YES in step S710), with reference to the management table 164, the CPU 110 specifies one or more candidate regions belonging to the designated group from the plurality of candidate regions (step S715). The CPU 110 assures a process region from the specified one or more candidate regions on the basis of the detected use state (steps S720 to S795). The CPU 110 outputs the address of the process region as information for accessing the assured process region to a master corresponding to the instruction (master executing a task) via the application 161 as the sender of the notification of the instruction (step S340).

Configuration 2

The CPU 110 according to the configuration 1 detects, as the use state, an ID task or a group task which uses each of the candidate regions (FIG. 6). In the case of assuring the process region on the basis of the detected use state, the CPU 110 narrows candidate regions which are not used by the GID task from the specified one or more candidate regions (YES in step S730) and assures the process region from the narrowed candidate regions (steps S750 to S770).

Configuration 3

The CPU 110 according to the configuration 1 detects, as the use state, an ID task or a group task which uses each of the candidate regions (FIG. 6). In the case of assuring the process region on the basis of the detected use state, the CPU 110 narrows candidate regions which are not used by a GID task and an ID task from the one or more candidate regions specified (YES in step S750), and assures the process region from the narrowed candidate regions (step S760).

Configuration 4

In the case where all of the narrowed one or more candidate regions are used by an ID task (NO in step S750), the CPU 110 according to the configuration 2 specifies a candidate region used by the least number of ID tasks from the one or more candidate regions, and assures a process region from the specified one or more candidate regions (step S770).

Configuration 5

When a candidate region which is not used by a GID task does not exist in the specified one or more candidate regions (NO in step S730), the CPU 110 according to the configuration 2 narrows candidate regions used by the least number of GID tasks, and assures a process region from the narrowed candidate regions (step S795).

Configuration 6

In the case where a plurality of candidate regions used by the least number of GID tasks exist (YES in step S780), the CPU 110 according to the configuration 5 narrows candidate regions used by the least number of ID tasks from the plurality of candidate regions and assures a process region from the narrowed candidate regions (step S790).

Configuration 7

In the configurations 1 to 6, in place of an ID identifying a candidate region, slave IDs identifying the memories 151 to 155 may be used.

Configuration 8

The storage device 160 according to the configuration 1 stores a management table 164A holding corresponding relations of an ID identifying each of candidate regions, a group ID identifying a group to which the candidate region belongs, and a slave ID identifying each of the memories. With reference to the management table 164A, on the basis of a use state of each candidate region and a memory to which the candidate region belongs, the CPU 110 detects the use state of each memory. The CPU 110 assures a process region from the specified one or more candidate regions on the basis of the use state of each of the memories (steps S1210 to S1270). For example, the CPU 110 detects a memory to which a candidate region having sufficient space belongs, specifies a memory which is not used by a GID task from the memory, and assures a process region from a candidate region belonging to the memory (steps S1210 to S1240). When a memory which is not used by a GID task does not exist (NO in step S1210), the CPU 110 assures a process region from a candidate region belonging to a memory which is used by the least number of GID tasks (steps S1250 to S1270).

Configuration 9

According to another embodiment, a semiconductor device 100C has a plurality of masters 121 to 123 and a plurality of buses 131 to 133. The buses are coupled to the masters, respectively. The semiconductor device 100C further includes a plurality of memories 151 to 155. Each of the memories is coupled to at least any of the plurality of buses. The semiconductor device 100C further includes: a CPU 110 for controlling an access from each of the masters to any of the plurality of memories via the bus coupled to the master; and a storage device 160 for storing a management table 164C holding a corresponding relation between an ID identifying each memory and a group ID identifying a group to which a candidate region belongs. By executing an OS 162C, the CPU 110 executes the following processes. The CPU 110 detects a use state of each memory. Based on the fact that an instruction (system call) of assuring a process region used by any of the plurality of masters from any of the plurality of memories (YES in step S1810), with reference to the management table 164C, the CPU 110 specifies one or more memories belonging to the designated group from the plurality of memories (step S1815). The CPU 110 assures a process region from the specified one or more memories on the basis of the detected use state (steps S1820 to S1860), and outputs the address of the process region as information for accessing the assured process region to a master corresponding to the instruction (master executing a task) via the application 161C as the sender of the notification of the instruction (step S1870).

Configuration 10

According to another aspect, a program (OS) executed by a CPU 110 of a semiconductor device employing a multi-layer bus configuration is provided. The semiconductor device includes a plurality of masters 121 to 123 and a plurality of memories 151 to 155. Each memory includes at least one candidate region. The semiconductor device further includes a storage device for storing a management table 164 holding a corresponding relation between an ID identifying each of the candidate regions and a group ID identifying a group to which the candidate region belongs. The program makes the CPU 110 execute: a step of detecting a use state of each of the memories; in the case where an instruction of assuring a process region used by any of a plurality of masters from any of a plurality of candidate regions includes designation of a group (YES in step S710), a step of specifying one or more candidate regions belonging to a designated group from a plurality of candidate regions with reference to the management table 164 (step S715); and a step of assuring a process region from the specified one or more candidate regions on the basis of the detected use state (steps S720 to S795).

Although the above-described various processes are realized by one CPU 110, the present disclosure is not limited to the above. Those various functions can be mounted by at least one semiconductor integrated circuit such as a processor, at least one ASIC (Application Specific Integrated Circuit), at least one DSP (Digital Signal Processor), at least one FPGA (Field Programmable Gate Array), and/or a circuit having another computing function.

Those circuits can execute the various processes by reading at least one instruction from at least one tangible readable medium.

Such a medium takes the form of a magnetic medium (for example, a hard disk), an optical medium (for example, a compact disk (CD) or DVD), or a memory of an arbitrary type such as a volatile memory or a nonvolatile memory. However, the present disclosure is not limited to those forms.

The volatile memory includes a DRAM (Dynamic Random Access Memory) and an SRAM (Static Random Access Memory). The nonvolatile memory includes a ROM and an NVRAM.

Although the present invention achieved by the inventors herein has been concretely described on the basis of the embodiments, obviously, the present invention is not limited to the foregoing embodiments but can be variously changed without departing from the gist.

What is claimed is:

1. A semiconductor device comprising:
a plurality of bus masters;
a plurality of buses which are coupled to the bus masters, respectively;
a plurality of memories each of which is coupled to at least any of the plurality of buses and each including at least one storage region;
a control device for controlling an access from each of the bus maters to any of the plurality of memories via the bus coupled to the bus master; and
a storage device for storing a corresponding relation between identification information identifying each of the storage regions and a group to which the storage region belongs,
wherein the control device detects a use state of each of the storage regions,
on the basis of an instruction of assuring a storage region used by any of the plurality of bus masters from the plurality of storage regions, with reference to a corresponding relation between a group designated by the instruction and the identification information from the corresponding relation, specifies one or more storage regions belonging to the designated group from the plurality of storage regions,
assures the storage region to be used from the specified one or more storage regions on the basis of the detected use state, and
outputs information for accessing the assured storage region to the bus master corresponding to the instruction,
wherein the storage device stores corresponding relations of identification information identifying each of the storage regions, a group to which the storage region belongs, and identification information identifying each of the memories, and
wherein in the case of assuring the storage region used on the basis of the detected use state, the control device assures the storage region used from the specified one or more storage regions on the basis of the use state of each of the memories detected from the detected use state and the corresponding relation.

2. The semiconductor device according to claim 1,
wherein the control device detects, as the use state, whether each of the plurality of storage regions is used by a process designating the identification information or a process designating the group,
in the case of assuring the storage region used on the basis of the detected use state, extracts a storage region which is not used by the process designating the group from the one or more storage regions specified, and assures the storage region used from the extracted storage region.

3. The semiconductor device according to claim 1, wherein the control device detects, as the use state, whether each of the plurality of storage regions is used by a process designating the identification information or a process designating the group,
in the case of assuring the storage region used on the basis of the detected use state, extracts a storage region which is not used by the process designating the group and the process designating the identification information from the one or more storage regions specified, and assures the storage region used from the extracted storage region.

4. The semiconductor device according to claim 1, wherein the identification information includes information identifying each of the memories.

5. The semiconductor device according to claim 2, wherein when all of the extracted one or more storage regions are used by the process designating the identification information, the control device specifies a storage region used by the least number of the process designating the identification information from the one or more storage regions, and assures the storage region used from the specified storage region.

6. The semiconductor device according to claim 2, wherein when a storage region which is not used by the process designating the group does not exist in the specified one or more storage regions, the control device extracts a storage region used by the least number of the process designating the group from the specified one or more storage regions, and assures the storage region used from the extracted storage region.

7. The semiconductor device according to claim 6, wherein when a plurality of storage regions used by the least number of the processes designating the group exist, the control device extracts a storage region used by the least number of the process designating the identification information from the plurality of storage regions, and assures the storage region used from the extracted storage region.

8. A semiconductor device comprising:
a plurality of bus masters;
a plurality of buses which are coupled to the bus masters, respectively;
a plurality of memories each of which is coupled to at least any of the plurality of buses;
a control device for controlling an access from each of the bus maters to any of the plurality of memories via the bus coupled to the bus master; and
a storage device for storing a corresponding relation between identification information identifying each of the memories and a group to which the memory belongs,
wherein the control device detects a use state of each of the memories,
on the basis of an instruction of assuring a storage region used by any of the plurality of bus masters from the plurality of memories, with reference to a corresponding relation between a group designated by the instruction and the identification information from the corresponding relation, specifies one or more memories belonging to the designated group from the plurality of memories,
assures the storage region to be used from the specified one or more memories on the basis of the detected use state, and
outputs information for accessing the assured storage region to the bus master corresponding to the instruction,
wherein the storage device stores corresponding relations of identification information identifying each of the storage regions, a group to which the storage region belongs, and identification information identifying each of the memories, and
wherein in the case of assuring the storage region used on the basis of the detected use state, the control device assures the storage region used from the specified one or more storage regions on the basis of the use state of each of the memories detected from the detected use state and the corresponding relation.

9. A program executed by a control device of a semiconductor device employing a multilayer bus configuration,
wherein the semiconductor device comprises:
a plurality of bus masters;
a plurality of memories each including at least one storage region; and
a storage device for storing a corresponding relation between identification information identifying each of the storage regions and a group to which the storage region belongs, and
wherein the program makes the control device executes:
detecting a use state of each of the storage regions;
on the basis of an instruction of assuring a storage region used by any of the plurality of bus masters from the plurality of storage regions, with reference to a corresponding relation between a group designated by the instruction and the identification information from the corresponding relation, specifying one or more storage regions belonging to the designated group from the plurality of storage regions, and
assuring the storage region used from the specified one or more storage regions on the basis of the detected use state,
wherein the storage device stores corresponding relations of identification information identifying each of the storage regions, a group to which the storage region belongs, and identification information identifying each of the memories, and
wherein in the case of assuring the storage region used on the basis of the detected use state, the control device assures the storage region used from the specified one or more storage regions on the basis of the use state of each of the memories detected from the detected use state and the corresponding relation.

* * * * *